(12) United States Patent
Oules et al.

(10) Patent No.: US 11,816,896 B2
(45) Date of Patent: *Nov. 14, 2023

(54) MEDIA SUMMARY GENERATION

(71) Applicant: GoPro, Inc., San Mateo, CA (US)

(72) Inventors: Anais Oules, Bordeaux (FR); Guillaume Oules, Bordeaux (FR)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/067,491

(22) Filed: Dec. 16, 2022

(65) Prior Publication Data

US 2023/0124691 A1    Apr. 20, 2023

Related U.S. Application Data

(63) Continuation of application No. 17/495,605, filed on Oct. 6, 2021, now Pat. No. 11,544,932, which is a continuation of application No. 17/204,902, filed on Mar. 17, 2021, now Pat. No. 11,144,767.

(51) Int. Cl.
  *G06V 20/40* (2022.01)
  *G11B 27/031* (2006.01)
  *G06V 40/16* (2022.01)

(52) U.S. Cl.
  CPC .............. *G06V 20/47* (2022.01); *G06V 20/41* (2022.01); *G06V 40/161* (2022.01); *G11B 27/031* (2013.01)

(58) Field of Classification Search
  None
  See application file for complete search history.

(56) References Cited

U.S. PATENT DOCUMENTS

| | | | |
|---|---|---|---|
| 10,319,410 | B1 | 6/2019 | Townsend |
| 10,541,000 | B1 | 1/2020 | Karakotsios |
| 10,817,998 | B1 | 10/2020 | Lebrun |
| 11,144,767 | B1 | 10/2021 | Oulès |
| 2003/0160944 | A1 | 8/2003 | Foote |
| 2008/0187231 | A1 | 8/2008 | Barbieri |
| 2008/0240503 | A1 | 10/2008 | Okada |
| 2009/0167877 | A1 | 7/2009 | Imamura |
| 2011/0150340 | A1* | 6/2011 | Gotoh .................. G06V 40/175 382/190 |
| 2011/0261219 | A1 | 10/2011 | Suzuki |
| 2011/0305395 | A1* | 12/2011 | Takayama ............ G11B 27/322 382/190 |
| 2013/0156321 | A1 | 6/2013 | Motoi |
| 2013/0321646 | A1 | 12/2013 | Meike |
| 2014/0270483 | A1 | 9/2014 | Lucey |
| 2015/0206000 | A1 | 7/2015 | El Kaliouby |
| 2015/0243325 | A1 | 8/2015 | Pacurariu |

(Continued)

FOREIGN PATENT DOCUMENTS

CN    111901627 A   * 11/2020   ........... H04N 21/234

*Primary Examiner* — Gelek W Topgyal
(74) *Attorney, Agent, or Firm* — ESPLIN & ASSOCIATES, PC

(57) ABSTRACT

A media summary is generated to include portions of media items. The portions of media items identified for inclusion in the media summary is determined based on the length of the media summary and classification of content depicted within the media items. Classification of content depicted within the media items includes number of smiles depicted within the media items.

18 Claims, 8 Drawing Sheets

(56) References Cited

U.S. PATENT DOCUMENTS

| | | |
|---|---|---|
| 2017/0242561 A1 | 8/2017 | Ochi |
| 2018/0173959 A1 | 6/2018 | Shah |
| 2019/0340252 A1 | 11/2019 | Huyghe |
| 2022/0300742 A1 | 9/2022 | Oulès |

* cited by examiner

Smile Probability

|        | Frame 01 | Frame 02 | Frame 03 | Frame 04 |
|--------|----------|----------|----------|----------|
| Face A | 0        | 30       | 60       | 90       |
| Face B | 95       | 95       | 95       | 95       |
| Face C | 50       | 50       | 50       | 50       |
| Face D | 90       | 60       | 30       | 0        |

FIG. 3 image A 500 image B 550 media summary 800

MEDIA SUMMARY GENERATION

FIELD

This disclosure relates to generation of a summary of media items using classification of content depicted within the media items.

BACKGROUND

A user may wish to create a summary of media items including particular content. Manually reviewing, editing, and combining media items may be difficult and time consuming.

SUMMARY

This disclosure relates to generation of media summaries. Media information, classification information, and/or other information may be obtained. The media information may define a set of media items. The classification information for the set of media items may classify content depicted within the set of media items. A length of a media summary to be generated may be determined. Portions of the set of media items for inclusion in the media summary may be identified based on the classification information, the length of the media summary to be generated, and/or other information. The media summary may be generated to include the portions of the set of media items.

A system that generates media summaries may include one or more electronic storage, processor, and/or other components. The electronic storage may store media information, information relating to media items, classification information, information relating to classification of content depicted within media items, information relating to portions of media items, information relating to media summaries, and/or other information.

The processor(s) may be configured by machine-readable instructions. Executing the machine-readable instructions may cause the processor(s) to facilitate generating media summaries. The machine-readable instructions may include one or more computer program components. The computer program components may include one or more of a media information component, a classification information component, a media summary length component, an identification component, a generation component, and/or other computer program components.

The media information component may be configured to obtain media information and/or other information. The media information may define a set of media items. In some implementations, the set of media items may include one or more images, one or more videos, and/or other media items.

The classification information component may be configured to obtain classification information for the set of media items and/or other information. The classification information may classify content depicted within the set of media items.

In some implementations, the classification information classifying the content depicted within the set of media items may include the classification information characterizing number of smiles depicted within the set of media items. In some implementations, the set of media items may include a video. The classification information characterizing the number of smiles depicted within the video may include the classification information defining number and probability of potential smiles within individual video frames of the video.

In some implementations, the classification information classifying the content depicted within the set of media items may further include the classification information characterizing duration of the smiles depicted within the set of media items. For example, the set of media items may include a video. The classification information may characterize a duration of a smile depicted within the video.

In some implementations, the classification information classifying the content depicted within the set of media items may further include the classification information characterizing number of faces depicted within the set of media items.

The media summary length component may be configured to determine a length of a media summary to be generated. In some implementations, the length of the media summary to be generated may be determined based on a length of music that provides accompaniment for the media summary.

The identification component may be configured to identify portions of the set of media items for inclusion in the media summary based on the classification information, the length of the media summary to be generated, and/or other information.

In some implementations, the portions of the set of media items may be identified for inclusion in the media summary based on the number of smiles depicted within the set of media items.

In some implementations, the portions of the set of media items may be identified for inclusion in the media summary further based on the duration of smiles depicted within the set of media items. For example, a portion of a video may be identified for inclusion in the media summary based on a duration of a smile depicted within the video.

In some implementations, the portions of the set of media items may be identified for inclusion in the media summary further based on the number of faces depicted within the set of media items. In some implementations, identification of the portions of the set of media items for inclusion in the media summary based on the number of smiles depicted within the set of media items and the number of faces depicted within the set of media items may include identification of the portions of the set of media items for inclusion in the media summary based on a ratio of the number of smiles depicted within the set of media items to the number of faces depicted within the set of media items.

The generation component may be configured to generate the media summary. The media summary may be generated to include the portions of the set of media items.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIG. 3 illustrates an example table of smile probability for different video frames within a video.

DETAILED DESCRIPTION

Figure 1:
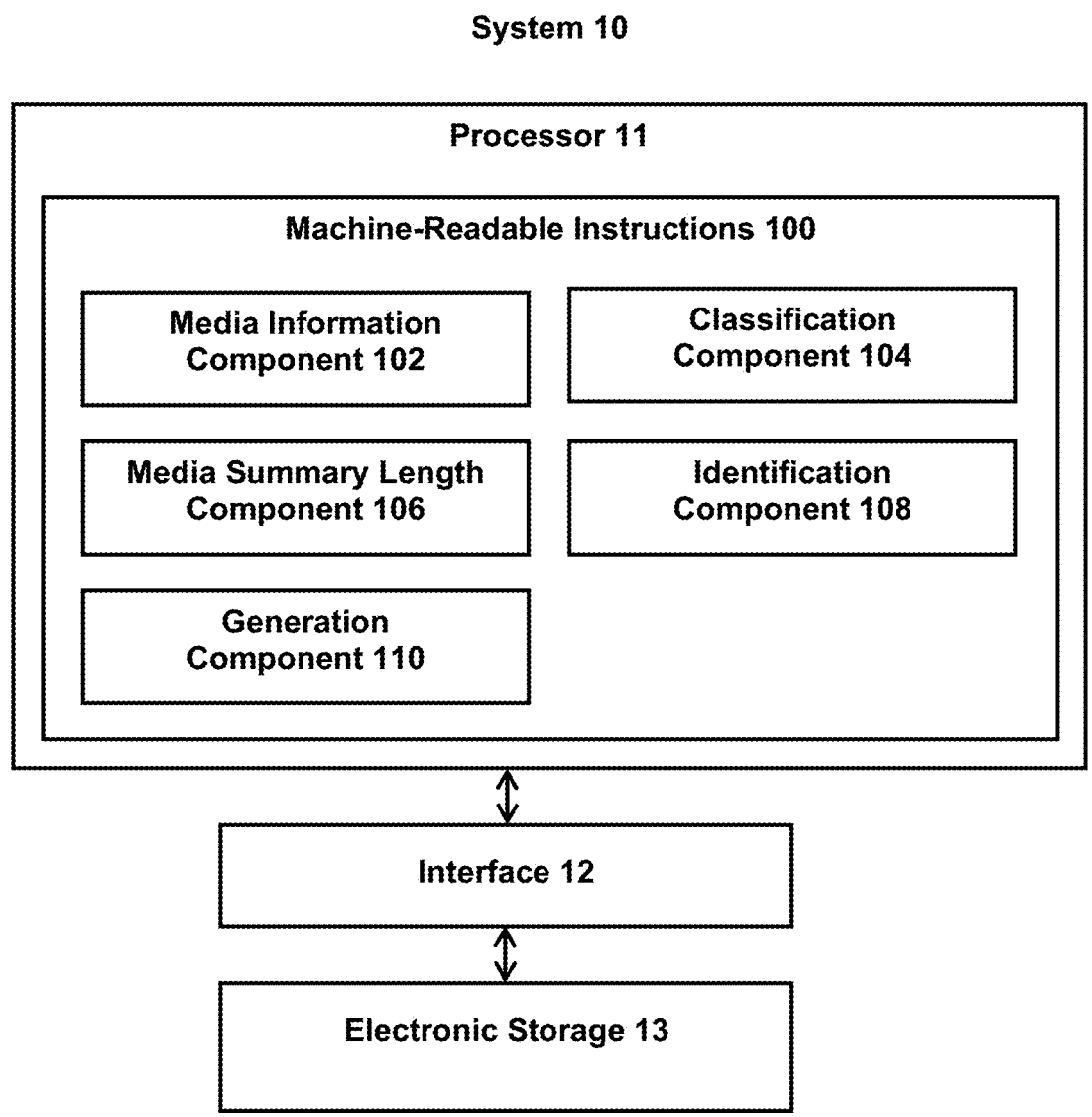
FIG. 1 illustrates a system that generates media summaries.

FIG. 1 illustrates a system 10 that generates media summaries. The system 10 may include one or more of a processor 11, an interface 12 (e.g., bus, wireless interface), an electronic storage 13, and/or other components. Media information, classification information, and/or other information may be obtained by the processor 11. The media information may define a set of media items. The classification information for the set of media items may classify content depicted within the set of media items. A length of a media summary to be generated may be determined by the processor 11. Portions of the set of media items for inclusion in the media summary may be identified by the processor 11 based on the classification information, the length of the media summary to be generated, and/or other information. The media summary may be generated by the processor 11 to include the portions of the set of media items.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store media information, information relating to media items, classification information, information relating to classification of content depicted within media items, information relating to portions of media items, information relating to media summaries, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate generating media summaries. The machine-readable instructions 100 may include one or more computer program components. The machine-readable instructions 100 may include one or more of a media information component 102, a classification information component 104, a media summary length component 106, an identification component 108, a generation component 110, and/or other computer program components.

The media information component 102 may be configured to obtain media information and/or other information. Obtaining media information may include one or more of accessing, acquiring, analyzing, determining, examining, generating, identifying, loading, locating, opening, receiving, retrieving, reviewing, selecting, storing, and/or otherwise obtaining the media information. The media information component 102 may obtain media information from one or more locations. For example, the media information component 102 may obtain media information from a storage location, such as the electronic storage 13, electronic storage of information and/or signals generated by one or more sensors, electronic storage of a device accessible via a network, and/or other locations. The media information component 102 may obtain media information from one or more hardware components (e.g., an image sensor, an image capture device, a network device, a storage device) and/or one or more software components (e.g., software running on a computing device).

In some implementations, the media information component 102 may obtain media information based on user interaction with a user interface/application (e.g., media editing application, media player application), and/or other information. For example, a user interface/application may provide option(s) for a user to select media items from which a media summary is to be generated. For instance, the user interface/application may provide option(s) for a user to select specific media items, select media items based on location in which the media items are stored, select media items based on metadata for the media items (e.g., location in which the media items were captured, date on which the media item were captured), select media items based on content depicted within the media items (e.g., classification of things depicted within the media items, such as objects, people, activity, emotion, and/or scenery), select media items based on type of media items, and/or otherwise select media items from which a media summary is to be generated. Other selections of media items for retrieval of media information are contemplated.

The media information may define a set of media items. A set of media items may include one or more media items. A set of media items may include a group of media items. In some implementations, media item(s) may be included within a set of media items manually (e.g., manual selection of media items by a user for inclusion within a set) and/or automatically (e.g., automatic selection of media items by software/algorithm for inclusion within a set). For example, a set of media items may include media items grouped together based on when they were captured (e.g., grouping based on similar/same time/day/month/season/year of capture), where they were captured (e.g., grouping based on similar/same location/area of capture), what they captured (e.g., grouping based on similar/same type of activity/entity/scene captured), and/or other factors.

Media items may refer to items that may be visually and/or audibly consumed. Media items may refer to multimedia items. For example, media items may include images, slideshows, videos, and/or other media items. For instance, the set of media items may include one or more images, one or more videos, and/or other media items. Individual media items may be stored in a single file or in multiple files. Multiple media items may be stored in a single file or in multiple files. Media items may be associated with metadata relating to capture and/or processing of the media items.

Media information may define a set of media items by including information that defines one or more content, qualities, attributes, features, and/or other aspects of the set of media items. For example, the media information may define a set of media items by including information that makes up the content of the set of media items and/or information that is used to determine the content of the set of media items. For instance, the media information may include information that makes up and/or is used to determine media items within the set of media items (e.g., information defining content of images, videos), information that defines and/or is used to determine which media items are included within the set of media items, and/or other information that defines the set of media items. The media information may be stored within a single file or multiple files. Other types of media information are contemplated.

The classification information component 104 may be configured to obtain classification information for the set of media items and/or other information. Obtaining classification information may include one or more of accessing, acquiring, analyzing, determining, examining, generating, identifying, loading, locating, opening, receiving, retrieving, reviewing, selecting, storing, and/or otherwise obtaining the classification information. The classification information component 104 may obtain classification information from one or more locations. For example, the classification information component 104 may obtain media information from a storage location, such as the electronic storage 13, electronic storage of information and/or signals generated by one or more sensors, electronic storage of a device accessible via a network, and/or other locations. The classification information component 104 may obtain classification information from one or more hardware components (e.g., an image sensor, an image capture device, a network device, a storage device) and/or one or more software components (e.g., software running on a computing device).

In some implementations, the classification information component 104 may obtain classification information for the set of media items based on analysis of the set of media items. The classification information component 104 may perform analysis of the content within the set of media items to obtain the classification information. For example, after the media items have been captured and stored, things depicted within the media items may be analyzed by the classification information component 104 (e.g., using computer vision) to obtain the classification information for the media items.

As another example, analysis of the content within the set of media items may have already been performed, and the classification information component 104 may obtain existing classification information for the set of media items. For instance, an image capture device may perform analysis of the content within the media items during capture of the media items to generate the classification information. The classification information may be stored with or separately from the media items. For instance, the classification information may be stored in one or more metadata tracks of the media items. Use of such existing classification information may enable the system 10 to generate media summaries at low cost. Such existing classification information may enable the system 10 to generate media summaries without having to perform analysis of the content of the media summaries.

The classification information may classify content depicted within the set of media items. Content depicted within the set of media items may refer to content captured within the set of media items. Content depicted within the set of media items may refer to visual representations of things depicted within the set of media items. Content depicted within the set of media items may refer to living and/or non-living things depicted within the set of media items. Content depicted within the set of media items may refer to moving and/or non-moving things depicted within the set of media items. For example, content depicted within the set of media items may include objects, parts of objects, people, parts of people, activity, emotion, scenery, and/or other thing depicted within the set of media items.

The classification information may classify content depicted within the set of media items. The classification information may classify content depicted within the set of media items by categorizing, characterizing, describing, defining, identifying, grouping, quantifying, and/or otherwise classifying the content depicted within the set of media items. The classification information may classify content depicted within the set of media items by providing definite and/or probability values of classification for the content depicted within the set of media items.

A definite value of classification for content depicted within a media item may specify whether or not a particular thing is depicted within a media item. For example, a definite value of classification for content depicted within a video frame may specify whether or not a face and/or a smile is depicted within the video frame.

A probability value of classification for content depicted within a media item may specify probability of a particular thing being depicted within a media item. A probability value (e.g., percentage, score) of classification for content depicted within a media item may reflect accuracy of detection of the particular thing within the media item. For example, a probability value of classification for content depicted within a video frame may specify probabilities that a face and/or a smile is depicted within the video frame.

In some implementations, the classification information may classify content depicted within the set of media items by characterizing (e.g., describing, defining, quantifying, setting forth) number of smiles depicted within the set of media items. In some implementations, the classification information characterizing the number of smiles depicted within the set of media items may include the classification information defining number and probability of potential smiles within the set of media items. A potential smile may refer to a thing depicted within a media item that has a non-zero probability of being a smile. A potential smile may refer to a thing depicted within a media items that has at least a threshold probability of being a smile.

In some implementations, the classification information may classify content depicted within the set of media items by characterizing number of faces depicted within the set of media items. In some implementations, the classification information characterizing the number of faces depicted within the set of media items may include the classification information defining number and probability of potential faces within the set of media items. A potential face may refer to a thing depicted within a media item that has a non-zero probability of being a face. A potential face may refer to a thing depicted within a media items that has at least a threshold probability of being a face.

In some implementations, classification of content depicted within the set of media items may include hierarchy of content categorization. For example, classification of smiles depicted within the set of media items may include a general categorization of whether or not a person's face includes a smile. The classification of smiles depicted within the set of media items may include sub-categorization of different types of smile (e.g., categorization based on intensity of smile, categorization based types of smile, such as closed-lip smile, open-mouth smile lopsided smile, forced smile).

For example, the set of media items may include a video. The classification information may classify content depicted within the video by providing definite and/or probability values of classification for the content depicted within the video. The definite and/or probability values of classification may be provided for one or more video frames of the video. For instance, definite and/or probability values of classification may be provided for one or more representative video frames of the video, for every video frame of the video, or for a subset of video frames of the video that are evenly spaced apart (e.g., every other video frame, every 10th video frame).

In some implementations, the classification information classifying the content depicted within the set of media items may include the classification information characterizing duration of the faces and/or the smiles depicted within the set of media items. For example, the classification information may characterize a duration of a smile depicted within the video. For instance, the classification information may characterize which temporal segments of the video includes a smile or includes at least a certain threshold value of smile probability. The classification information may characterize a duration of smile depicted within the video by identifying the duration that includes the smile or at least a certain threshold value of smile probability. The classification information may characterize a duration of smile depicted within the video by providing whether or not (or the probability that) individual moments/video frames within the video includes the depiction of smile. For instance, the classification information may provide probability values of smiles as a function of moments/video frames within the video.

FIG. 3 illustrates an example table of smile probability for different video frames within a video. In FIG. 3, four faces may be detected and/or tracked through four video frames. The classification information may provide values of probability that the individual detected/tracked faces includes a smile. For example, in Frame 01, the probability that Face A includes a smile may be 0%. In Frame 02, the probability that Face A includes a smile may be 30%. In Frame 03, the probability that Face A includes a smile may be 60%. In Frame 04, the probability that Face A includes a smile may be 90%. In some implementation, the classification information may provide values of probability that a particular thing depicted within the video frames is a face.

While the probability values are shown in FIG. 3 as percentage values, this is merely as an example and is not meant to be limiting. Use of other values, scores, and categorization to characterize content depicted within the set of media items are contemplated.

The media summary length component 106 may be configured to determine a length of a media summary to be generated. A media summary may refer to a grouping of multiple media items. A media summary may refer to an arrangement and/or manipulation of multiple media items. A media summary may provide a view of the multiple media items. A length of a media summary may refer to an amount of time to be occupied by the media summary. A length of a media summary may refer to an amount of play/presentation time for the media summary.

Determining a length of a media summary to be generated may include ascertaining, choosing, establishing, finding, identifying, obtaining, selecting, setting, and/or otherwise determining the length of the media summary to be generated. The length of the media summary to be generated may be determined based on one or more defaults, user selection, analysis of media items, and/or other information. Default selection of the length of the media summary may include the length of the media summary being set to a default value. User selection of the length of the media summary may include user providing input that select a particular length as the length of the media summary. Analysis of the media items to determine the length of the media summary may include select a particular length as the length of the media summary based on analysis of content (e.g., visual content, audio content), metadata, and/or other information relating to the media items.

In some implementations, the length of the media summary to be generated may be determined based on a length of music that provides accompaniment for the media summary. That is, the media summary may include music that is played while the media summary is being played/presented. The length of the media summary may be determined based on the length of the music that is to accompany the playback/presentation of the media summary. The length of the media summary may be set to be the same length as the length of the music. The length of the media summary may be set to be a fraction of the length of the music. The length of the media summary may be set to be a multiple of the length of the music. Other determination of the length of the media summary to be generated is contemplated.

The identification component 108 may be configured to identify portions of the set of media items for inclusion in the media summary. Identifying portions of the set of media items may include ascertaining, choosing, discovering, finding, selecting, and/or otherwise identifying the portions of the set of media items. One or more portions of the set of media items may be identified within a single media items. One or more portions of the set of media items may be identified across multiple media items.

A portion of the set of media items may refer to a part of the set of media items. A portion of the set of media items may include entirety of a media item included within the set of media items. For example, a portion of the set of media items may include an entire image or an entire video included within the set of media items. A portion of the set of media items may include a part of a media item included within the set of media items. For example, a portion of the set of media items may include a part of an image or a part of a video (e.g., a shorter segment of the video, a smaller field of view of the video). Same or different durations/lengths of different videos may be identified as portions for inclusion in the media summary.

The portions of the set of media items may be identified for inclusion in the media summary based on the classification information, the length of the media summary to be generated, and/or other information. The length of the media summary to be generated may determine number and/or length of the portions of the set of media items that are identified for inclusion in the media summary. For example, the length of the media summary to be generated may determine how many videos are selected for inclusion in the media summary and/or the lengths of segments that are pulled from the videos for inclusion in the media summary.

Use of the classification information to identify portions of the set of media items for inclusion in the media summary may enable the identification component 108 to identify the portions based on content depicted within the set of media items. That is, the identification component 108 may identify portions of the set of media items for inclusion in the media summary based on the content depicted within the set of media items. The identification component 108 may use classification of the content depicted within the set of media items provided by the classification information to identify which portions of the set of media items will be included in the media summary. The classification information may be used to identify media items that include depiction of particular content (media items that have particular definite and/or probability values of classification for particular content). For example, the identification component 108 may identify portions of the set of media items for inclusion in the media summary based on objects, people, activity, emotion, scenery, and/or other things depicted within the set of media items.

In some implementations, the portions of the set of media items may be identified for inclusion in the media summary based on music that provides accompaniment for the media summary. One or more characteristics of the music may be used to identify which portions of the set of media items are identified for inclusion in the media summary. Characteristics of the music may refer to features, qualities, properties, and/or other characteristics of the music. Characteristics of the music may refer to occurrence and/or properties of one or more events (e.g., beat, melody, high energy) that occur within the music. For example, the portions of the set of media items may be identified so that the portions included within the media summary are synchronized to event(s) (e.g., beat, melody) that occur within the music. For instance, the lengths of videos to be included within the media summary may be identified based on the length/timing of beats within the music so that transitions between the videos within the media summary occur with the beat. Other uses of music for identification of the portions of the set of media items are contemplated.

In some implementations, the portions of the set of media items may be identified for inclusion in the media summary based on metadata for the media times. For example, the media items may be filtered for/from identification based on location in which the media items were captured, the data on which the media items were captured, and/or other information relating to the capture of the media items. Such identification of the portions of the set of media items may enable media summary of particular capture context to be generated. For example, such identification of the portions of the set of media items may enable media summary of a particular location (e.g., media summary of a vacation spot) and/or particular date range to be generated (e.g., media summary of the past year).

Figure 4A:
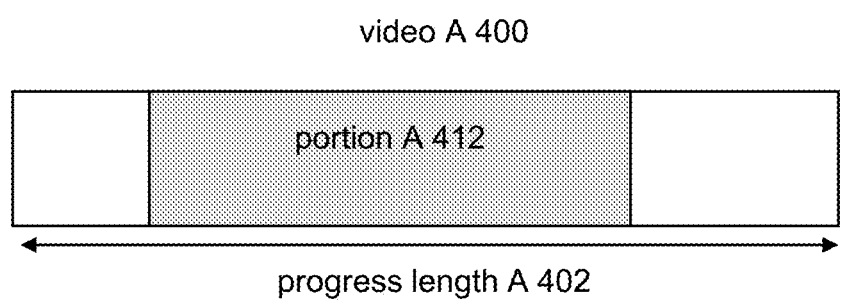
FIG. 4A illustrates an example portion within a video.
Figure 4B:
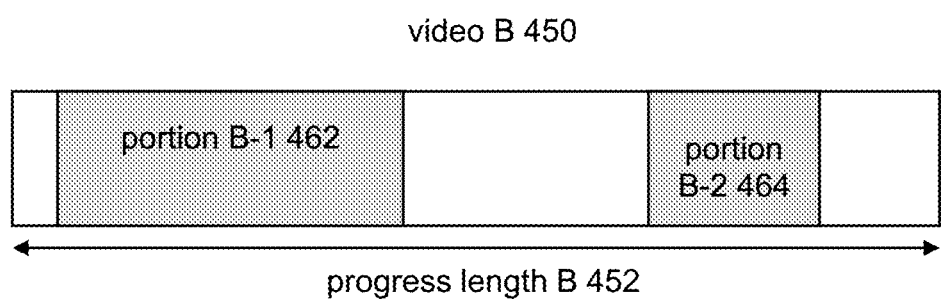
FIG. 4B illustrates example portions within a video.

FIGS. 4A and 4B illustrate example identification of portions within videos. In FIG. 4A, a video A 400 may have a progress length A 402. A portion A 412 of the video A 400 may be identified for inclusion in a media summary. The length of the portion A 412 may be shorter than the progress length A 402. In FIG. 4B, a video B 450 may have a progress length B 452. A portion B-1 462 and a portion B-2 464 of the video B 450 may be identified for inclusion in a media summary. The lengths of the portion B-1 462 and the portion B-2 464 may be shorter than the progress length B 452.

In some implementations, the portions of the set of media items may be identified for inclusion in the media summary based on the number of smiles depicted within the set of media items. For example, an image, a part of an image, a video, or a part of a video may be identified for inclusion in the media summary based on the number of smiles depicted within the image, the part of the image, the video, or the part of the video. In some implementations, the portions of the set of media items may be identified for inclusion in the media summary based on the number of smiles depicted within the portions being greater than a threshold number of smiles. For example, an image, a part of an image, a video, or a part of a video may be identified for inclusion in the media summary based on the number of smiles depicted within the image, the part of the image, the video, or the part of the video being greater than a threshold number of smiles.

In some implementations, the portions of the set of media items may be identified for inclusion in the media summary further based on the duration of smiles depicted within the set of media items. Duration of smiles may refer to the temporal length over which smiles are depicted within the set of media items. For example, a portion of a video may be identified for inclusion in the media summary based on a duration of a smile depicted within the video. For instance, referring to FIG. 4A, the portion A 412 may be identified for inclusion in the media summary based on one or more smiles being depicted within the video A 400 over the duration corresponding to the portion A 412. In some implementations, a portion of a video may be identified for inclusion in the media summary based on the probability of smile depiction over the corresponding duration. For instance, the portion of a video may be identified for inclusion in the media summary based on the average probability of smile depiction over the corresponding duration being greater than a threshold probability. The portion of a video may be identified for inclusion in the media summary based on the probability of smile depiction over the corresponding duration not falling below a threshold probability. The portion of a video may be identified for inclusion in the media summary based on the probability of smile depiction over the corresponding duration being consistent (e.g., not varying by more than a threshold amount) throughout the duration.

In some implementations, a portion of a video may be identified for inclusion in the media summary so that the portion includes a transition of one or more persons not smiling to the person(s) smiling. The portion of the video may cover a duration in which the probability of the person(s) smiling increases over time/video frames. For example, a duration of a video may include depiction of a person's face, with the probability of the person smiling increasing over the duration (e.g., from 0%, to 30%, to 60%, to 90%). The portion of the video may be identified to include the duration over which probability indicates that the person goes from not smiling to smiling.

In some implementations, the portions of the set of media items may be identified for inclusion in the media summary further based on the number of faces depicted within the set of media items. For example, an image, a part of an image, a video, or a part of a video may be identified for inclusion in the media summary based on the number of faces depicted within the image, the part of the image, the video, or the part of the video. In some implementations, the portions of the set of media items may be identified for inclusion in the media summary based on the number of faces depicted within the portions being greater than a threshold number of faces. For example, an image, a part of an image, a video, or a part of a video may be identified for inclusion in the media summary based on the number of faces depicted within the image, the part of the image, the video, or the part of the video being greater than a threshold number of faces.

In some implementations, the portions of the set of media items may be identified for inclusion in the media summary further based on the duration of faces depicted within the set of media items. Duration of faces may refer to the temporal length over which faces are depicted within the set of media items. For example, a portion of a video may be identified for inclusion in the media summary based on a duration of a face depicted within the video. For instance, referring to FIG. 4A, the portion A 412 may be identified for inclusion in the media summary based on one or more faces being depicted within the video A 400 over the duration corresponding to the portion A 412. In some implementations, a portion of a video may be identified for inclusion in the media summary based on the probability of face depiction over the corresponding duration. For instance, the portion of a video may be identified for inclusion in the media summary based on the average probability of face depiction over the corresponding duration being greater than a threshold probability. The portion of a video may be identified for inclusion in the media summary based on the probability of face depiction over the corresponding duration not falling below a threshold probability. The portion of a video may be identified for inclusion in the media summary based on the probability of face depiction over the corresponding duration being consistent (e.g., not varying by more than a threshold amount) throughout the duration. In some implementations, use of both face detection and smile detection may reduce inclusion of false positive smiles within the media summary. For example, use of smile detection alone may result in false detection of smiles within an image or a video. Requirement that a media item pass through both smile detection and face detection may reduce the likelihood of a media item without depiction of smile being identified for inclusion in the media summary.

In some implementations, identification of the portions of the set of media items for inclusion in the media summary based on the number of smiles depicted within the set of media items and the number of faces depicted within the set of media items may include identification of the portions of the set of media items for inclusion in the media summary based on a ratio of the number of smiles depicted within the set of media items to the number of faces depicted within the set of media items. The number of smile depicted within a media item may be compared to the number of smiles depicted within the media item to determine whether the media item will be identified for inclusion in the media summary. In some implementations, the portions of the set of media items may be identified for inclusion in the media summary based the ratio of the number of smiles depicted within the set of media items to the number of faces depicted within the set of media items being greater than a threshold ratio. Rather than identifying media items based strictly on total number of smiles, the media items may be identified for inclusion in the media summary based on the fraction of depicted faces that have smiles.

Figure 5A:
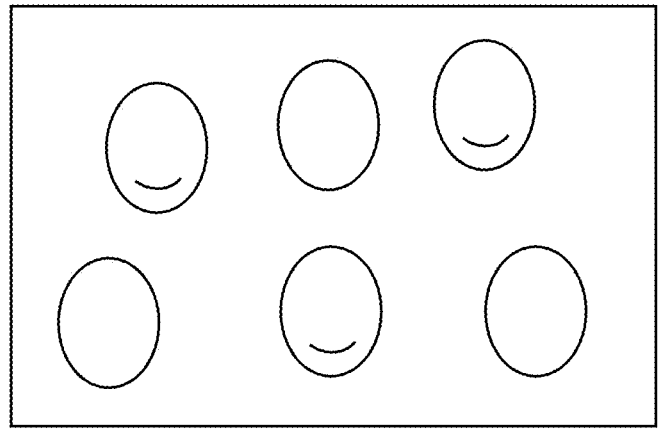
FIG. 5A illustrates example faces and smiles depicted within an image.
Figure 5B:
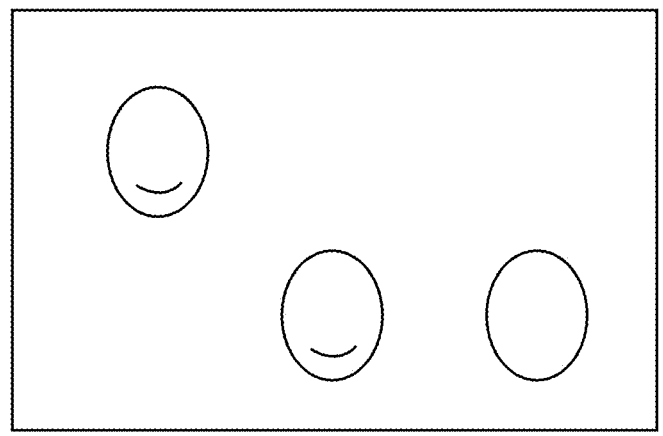
FIG. 5B illustrates example faces and smiles depicted within an image.

For example, FIGS. 5A and 5B illustrate example faces and smiles depicted within images. In FIG. 5A, an image A 500 may include depiction of six faces and three smiles. In FIG. 5B, an image B 550 may include depiction of three faces and two smiles. Identification of images based on number of smiles alone may result in the image A 500 being identified for inclusion within the media summary and the image B 550 not being identified for inclusion within the media summary because the image A 500 includes greater number of smiles than the image B 550.

However, it may be desirable to have a balance of faces and smiles within the media summary. In such a case, the ratio of smiles to faces may be used to identify media items for inclusion in the summary. For instance, identification of images based on the ratio of smiles to faces may result in the image B 550 being identified for inclusion within the media summary and the image A 500 not being identified for inclusion within the media summary because the ratio of smiles to faces is greater in the image B 550 than in the image A 500.

In some implementations, one or more criteria used for identification of media items for inclusion within the media summary may be automatically changed. The criteria may be changed based on the number of smiles depicted within the media items, the number of faces depicted within the media items, the duration of smiles/faces within the media items, the length of the media summary, and/or other information. For example, the threshold number of smiles, the threshold number of faces, and/or the threshold ratio of smiles to faces that must be satisfied by the media items for inclusion in the media summary may be decreased based on the current value(s) for the threshold(s) not finding sufficient media items to fill the length of the media summary. The threshold number of smiles, the threshold number of faces, and/or the threshold ratio of smiles to faces that must be satisfied by the media items for inclusion in the media summary may be increased based on the current value(s) for the threshold(s) finding too many media items to fill the length of the media summary. As another example, the durations of videos that are identified for inclusion in the media summary may be automatically changed. The durations of videos that are identified for inclusion in the media summary may be increased based on the current durations not being enough to fill the length of the media summary. The durations of videos that are identified for inclusion in the media summary may be decreased based on the current durations being too long to fit within the length of the media summary.

The generation component 110 may be configured to generate the media summary. The media summary may be generated to have the length determined by the media summary length component 106. The media summary may be generated to include the portions of the set of media items identified by the identification component 108. In some implementations, the media summary may be generated to include accompaniment of music. The music may provide background sound/soundtrack for playback/presentation of the media summary.

In some implementations, one or more visual effects (effects that change visual characteristics) and/or one or more temporal effects (effects that change temporal characteristics) may be applied to the portions of the set of media items included within the media summary. The visual effect(s) and/or the temporal effect(s) may be applied based on user input, highlight detection, music that accompanies the playback of the media summary, and/or other information. In some implementations, one or more transition effects may be applied between the different portions of the set of media items included within the media summary.

Figure 6:
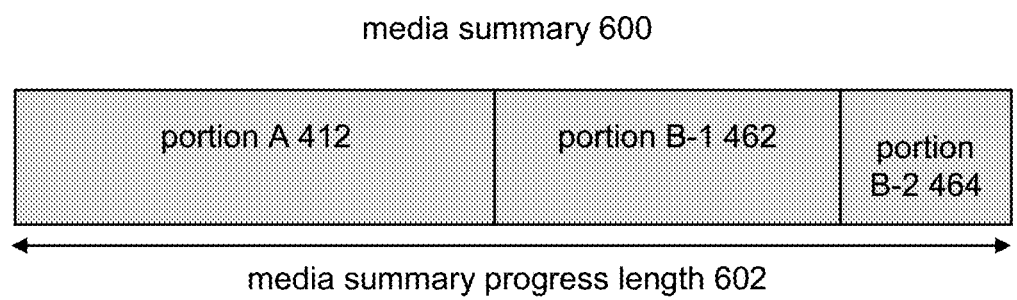
FIG. 6 illustrates an example media summary.

FIG. 6 illustrates an example media summary 600. The media summary 600 may have a media summary progress length 602. The media summary 600 may include, in order, the portion A 412 (of the video A 400), the portion B-1 462 (of the video B 450), and the portion B-2 464 (of the video B 450). The media summary 600 may include/be accompanied by music.

Figure 7A:
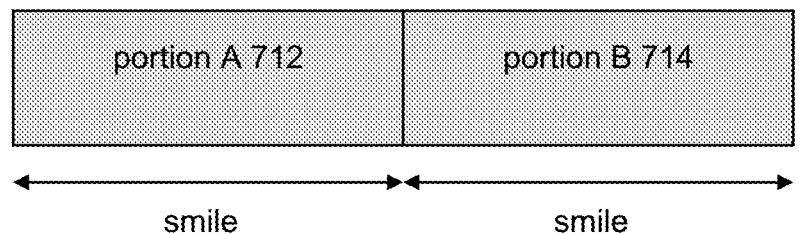
FIG. 7A illustrates an example media summary.

FIG. 7A illustrates an example media summary 700. The media summary 700 may include a portion A 712 and a portion B 714 of one or more videos. The portion A 712 and the portion B 714 included within the media summary 700 may include depiction of smile throughout the durations. That is, the entire durations of the portion A 712 and the portion B 714 may include depiction of smile. The media summary 700 may provide an overview of media items by including portions of the media items that depict smiles.

Figure 7B:
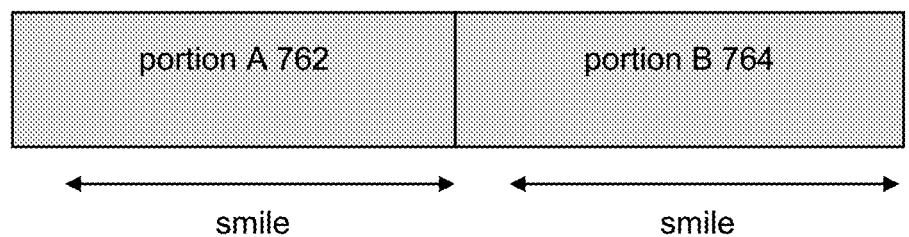
FIG. 7B illustrates an example media summary.

FIG. 7B illustrates an example media summary 750. The media summary 750 may include a portion A 762 and a portion B 764 of one or more videos. The portion A 712 and the portion B 714 included within the media summary 700 may include change from depiction of no smile to depiction of smile. The beginning parts of the durations of the portion A 712 and the portion B 714 may not include depiction of smile and the ending parts of the durations of the portion A 712 and the portion B 714 may include depiction of smile. The media summary 750 may provide an overview of media items by including portions of the media items that depict person(s)' face(s) changing from not smiling to smiling.

Figure 8:
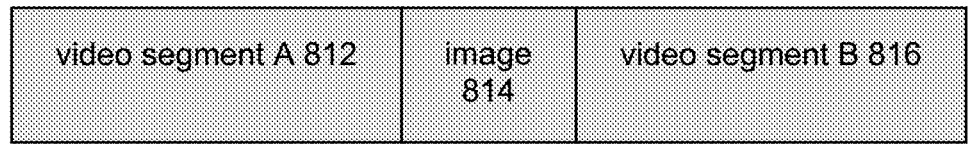
FIG. 8 illustrates an example media summary.

FIG. 8 illustrates an example media summary 800. The media summary 800 may include a video segment A 812, an image 814, and a video segment B 816. The image 814 may be duplicated to fill a duration within the media summary 800. The image 814 may be a standalone image, a video frame of a video, and/or other image. The video segment A 812, the image 814, and the video segment B 816 may be included within the media summary 800 based on number of smiles depicted within the video segment A 812, the image 814, and the video segment B 816. Other inclusion of media items within the media summary is contemplated.

In some implementations, the media summary may be generated as encoded video content (e.g., encoded video file) and/or as instructions for presenting the video content. For example, the media summary may be generated as an encoded version of a particular video clip, and the video clip may be opened in a video player for played on the display(s). The media summary may be generated as instructions identifying portions of the media items that are included in the media summary, the order in which the portions appear, the effects (e.g., visual effects, temporal effects) to be applied to the portion(s), and the music to accompany the media summary. A video player may use the instructions to retrieve the portion(s) of the media items and the music identified in the instructions for playback/presentation.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
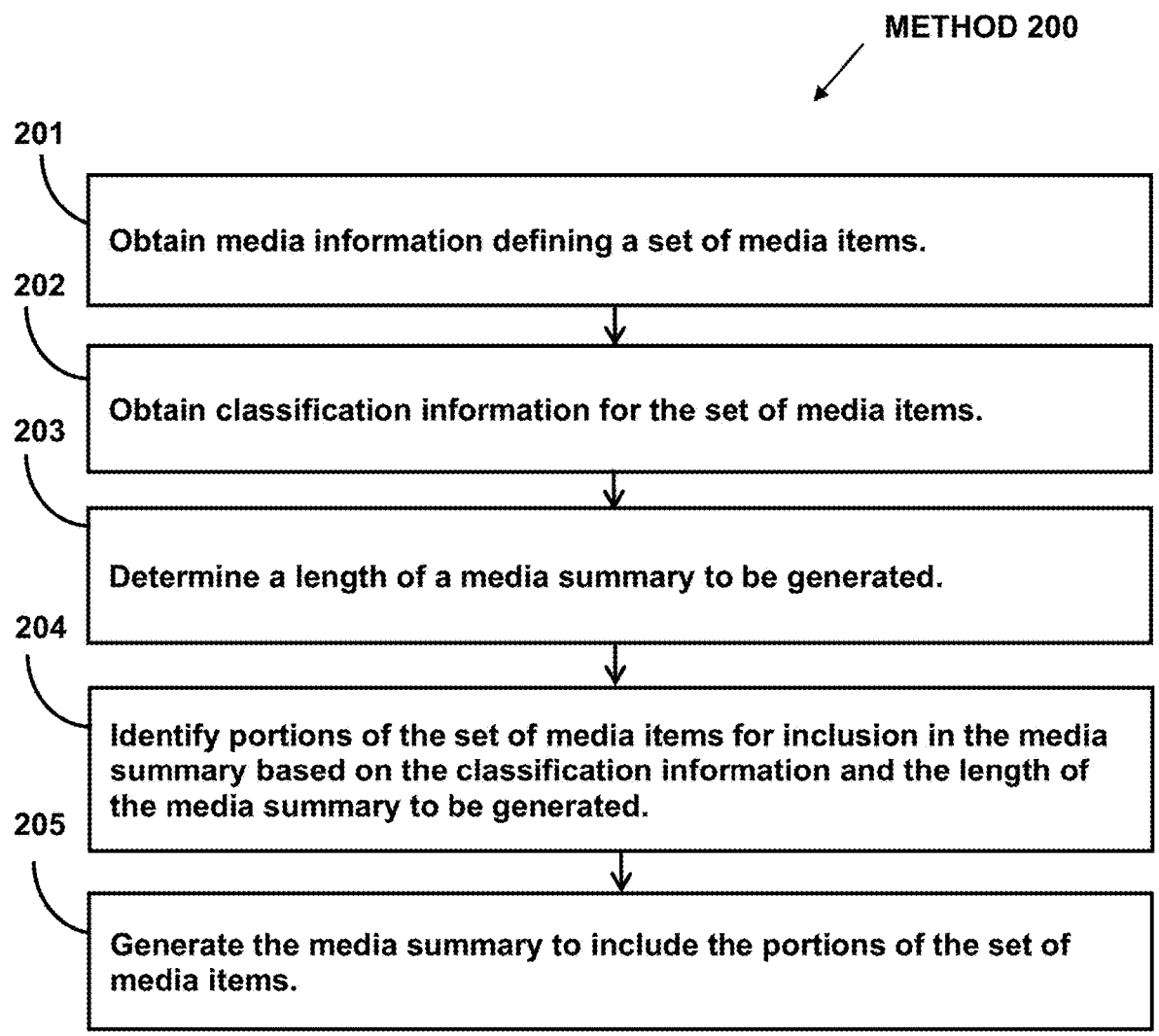
FIG. 2 illustrates a method for generating media summaries.

FIG. 2 illustrates method 200 for generating media summaries. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, media information may be obtained. The media information may define a set of media items. In some implementations, operation 201 may be performed by a processor component the same as or similar to the media information component 102 (Shown in FIG. 1 and described herein).

At operation 202, classification information for the set of media items may be obtained. The classification information may classify content depicted within the set of media items. In some implementations, operation 202 may be performed by a processor component the same as or similar to the classification information component 104 (Shown in FIG. 1 and described herein).

At operation 203, a length of a media summary to be generated may be determined. In some implementations, operation 203 may be performed by a processor component the same as or similar to the media summary length component 106 (Shown in FIG. 1 and described herein).

At operation 204, portions of the set of media items for inclusion in the media summary may be identified based on the classification information and the length of the media summary to be generated. In some implementations, operation 204 may be performed by a processor component the same as or similar to the identification component 108 (Shown in FIG. 1 and described herein).

At operation 205, the media summary may be generated to include the portions of the set of media items. In some implementations, operation 205 may be performed by a processor component the same as or similar to the generation component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for generating media summaries, the system comprising:
one or more physical processors configured by machine-readable instructions to:
obtain media information defining one or more media items;
obtain classification information for the one or more media items, the classification information characterizing number of smiles and number of faces depicted within the one or more media items and duration of the smiles depicted within the one or more media items; and
identify a given media item or a part of the given media item for inclusion in a media summary based on a ratio based on the number of smiles and the number of faces depicted within the one or more media items and based on the duration of the smiles depicted within the one or more media items.

2. The system of claim 1, wherein the one or more media items include one or more images and/or one or more videos.

3. The system of claim 1, wherein:
the one or more physical processors are further configured by the machine-readable instructions to determine a length of the media summary to be generated; and
the given media item or the part of the given media item is identified for inclusion in the media summary further based on the length of the media summary to be generated.

4. The system of claim 3, wherein the length of the media summary to be generated is determined based on a length of music that provides accompaniment for the media summary.

5. The system of claim 1, wherein:
the classification information further characterizes different types of smiles depicted within the one or more media items; and
the given media item or the part of the given media item is identified for inclusion in the media summary further based on the different types of smiles depicted within the one or more media items.

6. The system of claim 1, wherein the identification of the given media item or the part of the given media item for inclusion in the media summary based on the ratio based on the number of smiles and the number of faces depicted within the one or more media items includes identification of the given media item or the part of the given media item that have a higher ratio based on the number of smiles and the number of faces.

7. The system of claim 1, wherein the given media item or the part of the given media item is identified for inclusion in the media summary based on the ratio based on the number of smiles and the number of faces depicted within the given media item or the part of the given media item satisfying a threshold ratio of smiles and faces.

8. The system of claim 7, wherein:
- the threshold ratio of smiles and faces that must be satisfied for the given media item or the part of the given media item to be identified for inclusion in the media summary is decreased based on insufficient media items being identified for inclusion in the media summary; and
- the threshold ratio of smiles and faces that must be satisfied for the given media item or the part of the given media item to be identified for inclusion in the media summary is increased based on more than sufficient media items being identified for inclusion in the media summary.

9. A method for generating media summaries, the method performed by a computing system including one or more processors, the method comprising:
- obtaining, by the computing system, media information defining one or more media items;
- obtaining, by the computing system, classification information for the one or more media items, the classification information characterizing number of smiles and number of faces depicted within the one or more media items and duration of the smiles depicted within the one or more media items; and
- identifying, by the computing system, a given media item or a part of the given media item for inclusion in the media summary based on a ratio based on the number of smiles and the number of faces depicted within the one or more media items and based on the duration of the smiles depicted within the one or more media items.

10. The method of claim 9, wherein the one or more media items include one or more images and/or one or more videos.

11. The method of claim 9, further comprising determining, by the computing system, a length of a media summary to be generated, wherein the given media item or the part of the given media item is identified for inclusion in the media summary further based on the length of the media summary to be generated.

12. The method of claim 11, wherein the length of the media summary to be generated is determined based on a length of music that provides accompaniment for the media summary.

13. The method of claim 9, wherein:
- the classification information further characterizes different types of smiles depicted within the one or more media items; and
- the given media item or the part of the given media item is identified for inclusion in the media summary further based on the different types of smiles depicted within the one or more media items.

14. The method of claim 9, wherein the identification of the portions of the given media item or the part of the given media item for inclusion in the media summary based on the ratio based on the number of smiles to the number of faces depicted within the one or more media items includes identification of the given media item or the part of the given media item that have a higher ratio based on the number of smiles and the number of faces.

15. The method of claim 9, wherein the given media item or the part of the given media item is identified for inclusion in the media summary based on the ratio based on the number of smiles and the number of faces depicted within the given media item or the part of the given media item satisfying a threshold ratio of smiles and faces.

16. The method of claim 15, wherein:
- the threshold ratio of smiles and faces that must be satisfied for the given media item or the part of the given media item to be identified for inclusion in the media summary is decreased based on insufficient media items being identified for inclusion in the media summary; and
- the threshold ratio of smiles and faces that must be satisfied for the given media item or the part of the given media item to be identified for inclusion in the media summary is increased based on more than sufficient media items being identified for inclusion in the media summary.

17. A system for generating media summaries, the system comprising:
- one or more physical processors configured by machine-readable instructions to:
  - obtain media information defining a one or more media items;
  - obtain classification information for the one or more media items, the classification information characterizing number of smiles and number of faces depicted within the one or more media items and duration of the smiles depicted within the one or more media items; and
  - identify a given media item or a part of the given media item for inclusion in a media summary based on a ratio based on the number of smiles and the number of faces depicted within the one or more media items by identifying the given media item or the part of the given media item that have a higher ratio of the number of smiles to the number of faces and based on the duration of the smiles depicted within the one or more media items.

18. The system of claim 17, wherein:
- the one or more physical processors are further configured by the machine-readable instructions to determine a length of the media summary to be generated based on a length of music that provides accompaniment for the media summary; and
- the given media item or the part of the given media item is identified for inclusion in the media summary further based on the length of the media summary to be generated.

* * * * *